United States Patent
McLean et al.

(10) Patent No.: US 10,534,882 B2
(45) Date of Patent: Jan. 14, 2020

(54) METHOD AND APPARATUS FOR CONFIGURING AN INTEGRATED CIRCUIT WITH A REQUESTED FEATURE SET

(71) Applicant: QUALCOMM Incorporated, San Diego, CA (US)

(72) Inventors: Ivan McLean, San Diego, CA (US); Stuart Moskovics, San Diego, CA (US); Bryan Campbell, Portsmouth, NH (US); Mark Dragicevich, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 631 days.

(21) Appl. No.: 15/234,879

(22) Filed: Aug. 11, 2016

(65) Prior Publication Data

US 2017/0286580 A1 Oct. 5, 2017

Related U.S. Application Data

(60) Provisional application No. 62/314,928, filed on Mar. 29, 2016.

(51) Int. Cl.
G06F 17/50 (2006.01)
G06F 21/57 (2013.01)
G06F 21/76 (2013.01)

(52) U.S. Cl.
CPC .......... *G06F 17/5045* (2013.01); *G06F 21/57* (2013.01); *G06F 21/76* (2013.01)

(58) Field of Classification Search
USPC ........................................................ 716/138
See application file for complete search history.

(56) References Cited

U.S. PATENT DOCUMENTS

| | | | |
|---|---|---|---|
| 7,693,596 B2 | 4/2010 | Sauber et al. | |
| 7,852,697 B2 | 12/2010 | Archibald et al. | |
| 2005/0138384 A1 | 6/2005 | Brickell et al. | |
| 2009/0300758 A1 | 12/2009 | Hauck et al. | |
| 2013/0086385 A1 | 4/2013 | Poeluev | |
| 2014/0044265 A1* | 2/2014 | Kocher | H04L 9/083 380/277 |
| 2014/0359755 A1 | 12/2014 | Beitel et al. | |

FOREIGN PATENT DOCUMENTS

EP 0743602 A1 11/1996
EP 2911086 A1 8/2015

OTHER PUBLICATIONS

International Search Report and Written Opinion—PCT/US2017/021611—ISA/EPO—dated May 23, 2017.

* cited by examiner

*Primary Examiner* — Eric D Lee
(74) *Attorney, Agent, or Firm* — Loza & Loza, LLP

(57) ABSTRACT

A method for configuring the features of an integrated circuit. In the method, the integrated circuit receives a feature vector message from a first party. The feature vector message is included in a response to a feature set request from the first party to a second party. The integrated circuit configures at least one feature of the integrated circuit based on a feature vector in the feature vector message. The integrated circuit generates an attestation result based on the at least one configured feature of the integrated circuit and using a key securely stored in the integrated circuit and known to the second party and not known to the first party. The integrated circuit forwards the attestation result to the first party.

30 Claims, 6 Drawing Sheets

METHOD AND APPARATUS FOR CONFIGURING AN INTEGRATED CIRCUIT WITH A REQUESTED FEATURE SET

CROSS-REFERENCE TO RELATED APPLICATION

This application claims the benefit of U.S. Provisional Application No. 62/314,928, filed Mar. 29, 2016, which application is incorporated herein by reference.

BACKGROUND

Field

The present invention relates generally to configuring an integrated circuit with a feature set requested by an Original Equipment Manufacturer (OEM).

Background

A modern System-on-Chip (SoC) design may contain hundreds or even thousands of distinct hardware and software features. These features are intended to address different markets, standards, product tiers and use cases. Some features are not required or even desirable in some products, and customers do not want to pay for features that are not used. Accordingly, a chip supplier may create many different versions, each supporting a different subset of features. However, it may be impractical for the chip supplier to create physically distinct SoC versions, where each version physically adds or removes the specific hardware logic.

Instead, the supplier may make physically distinct SoC versions, where each version is intended to target a broad tier of the overall market. Each of these versions may be further customized, where certain features are enabled or disabled by the supplier during chip manufacture. As result, physically identical SoCs may support different feature sets, and may be priced accordingly.

This creates several significant issues for both the chip supplier and Original Equipment Manufacturers (OEMs). These include inventory management issues for both supplier and OEM. The supplier must decide exactly how many of a given version to manufacture, well ahead of fulfilling orders. The OEM must decide exactly how many of a given model they intend to manufacture. This forecasting by both parties must be done months ahead of the availability of any hard sales figures. If the OEM orders too few parts, they face the prospect of possible manufacturing delays while subsequent orders are fulfilled. If the OEM orders too many, they must carry the cost of the unused parts. If the supplier manufactures too many of a given version, these chips may end up on a "bone pile" of chips that cannot be sold. Further, each of these many versions may introduce a dedicated "lane" for fabrication, testing, physical marking, storage, tracking and shipment. Chips in one lane may not be mixed with those in another lane.

There is therefore a need for a technique for configuring an integrated circuit with features in a manner that is advantageous to the OEM and the chip supplier.

SUMMARY

An aspect of the present invention may reside in a method for configuring an integrated circuit. In the method, the integrated circuit receives a feature vector message from a first party. The feature vector message is included in a response to a feature set request from the first party to a second party. The integrated circuit configures at least one feature of the integrated circuit based on a feature vector in the feature vector message. The integrated circuit generates an attestation result based on the at least one configured feature of the integrated circuit and using a key securely stored in the integrated circuit and known to the second party and not known to the first party. The integrated circuit may forward the attestation result to the first party.

In more detailed aspects of the invention, the integrated circuit may be a system-on-a-chip (SOC) device, the first party may an original equipment manufacturer (OEM), and/or the second party may be a supplier of the integrated circuit. The integrated circuit may be identified by a unique identifier, and the key may be unique to the integrated circuit. Also, the feature set may correspond to a stock keeping unit (SKU).

In other more detailed aspects of the invention, the feature vector message may be signed by the second party, and the method may further comprise: validating, by the integrated circuit, the feature vector message using a signature of the feature vector message. In addition, the method may further comprise: setting, by the integrated circuit, at least one flag in a one-time-programmable (OTP) memory, wherein each set flag is associated with a feature of the integrated circuit. A set flag in the OTP memory may correspond to a disabled feature, or an enabled feature.

Another aspect of the invention may reside in an integrated circuit, comprising: means for receiving a feature vector message from a first party, wherein the feature vector message is included in a response to a feature set request from the first party to a second party; means for configuring at least one feature of the integrated circuit based on a feature vector in the feature vector message; means for generating an attestation result based on the at least one configured feature of the integrated circuit and using a key securely stored in the integrated circuit and known to the second party and not known to the first party; and means for forwarding the attestation result to the first party.

Another aspect of the invention may reside in an integrated circuit, comprising: a processor configured to: receive a feature vector message from a first party, wherein the feature vector message is included in a response to a feature set request from the first party to a second party; configure at least one feature of the integrated circuit based on a feature vector in the feature vector message; generate an attestation result based on the at least one configured feature of the integrated circuit and using a key securely stored in the integrated circuit and known to the second party and not known to the first party; and forward the attestation result to the first party.

Another aspect of the invention may reside in a method for configuring an integrated circuit. In the method, a first party forwards a request for a feature set to a second party. In response, the first party receives a feature vector message from the second party. The first party forwards the feature vector message to the integrated circuit. The first party receives an attestation result based on at least one configured feature of the integrated circuit and further based on a key securely stored in the integrated circuit and known to the second party and not known to the first party. The first party forwards the attestation result the feature set, and a unique identifier for the integrated circuit, to the second party Another aspect of the invention may reside in a station, comprising: means for forwarding a request for a feature set to another station; means for receiving a feature vector message from the another station; means for forwarding the feature vector message to an integrated circuit; means for receiving an attestation result based on at least one configured feature of the integrated circuit and further based on a key securely stored in the integrated circuit and known to the another station and not known to the station; and means for forwarding the attestation result, the feature set, and a unique identifier for the integrated circuit, to the another station.

Another aspect of the invention may reside in a station, comprising: a processor configured to: forward a request for a feature set to another station; receive a feature vector message from the another station; forward the feature vector message to an integrated circuit; receive an attestation result based on at least one configured feature of the integrated circuit and further based on a key securely stored in the integrated circuit and known to the another station and not known to the station; and forward the attestation result, the feature set, and a unique identifier for the integrated circuit, to the another station.

Another aspect of the invention may reside in a computer-readable medium, comprising: code for causing a computer to forward a request for a feature set to another computer; code for causing the computer to receive a feature vector message from the another computer; code for causing the computer to forward the feature vector message to an integrated circuit; code for causing the computer to receive an attestation result based on at least one configured feature of the integrated circuit and further based on a key securely stored in the integrated circuit and known to the another computer and not known to the computer; and code for causing the computer to forward the attestation result, the feature set, and a unique identifier for the integrated circuit, to the another station.

Another aspect of the present invention may reside in a method for validating features of an integrated circuit. In the method, a second party receives a request for a feature set from a first party. The second party forwards a feature vector message to the first party. The second party receives an attestation result, the feature set, and a unique identifier for the integrated circuit, from the first party. The attestation result is based on at least one configured feature of the integrated circuit and is further based on a key securely stored in the integrated circuit and known to the second party and not known to the first party. The second party validates the attestation result using the key.

Another aspect of the invention may reside in a station, comprising: means for receiving a request for a feature set from another station; means for forwarding a feature vector message to the another station; means for receiving an attestation result, the feature set, and a unique identifier for an integrated circuit, from the another station, wherein the attestation result is based on at least one configured feature of the integrated circuit and is further based on a key securely stored in the integrated circuit and known to the station and not known to the another station; and means for validating the attestation result using the key.

Another aspect of the invention may reside in a station, comprising: a processor configured to: receive a request for a feature set from another station; forward a feature vector message to the another station; receive an attestation result, the feature set, and a unique identifier for an integrated circuit, from the another station, wherein the attestation result is based on at least one configured feature of the integrated circuit and is further based on a key securely stored in the in circuit and known to the station and not known to the another station; and validate the attestation result using the key.

Another aspect of the invention may reside in a computer-readable medium, comprising: code for causing a computer to receive a request for a feature set from a another computer; code for causing the computer to forward a feature vector message to the another computer; code for causing the computer to receive an attestation result, the feature set, and a unique identifier for an integrated circuit, from the another computer, wherein the attestation result is based on at least one configured feature of the integrated circuit and is further based on a key securely stored in the integrated circuit and known to the computer and not known to the another computer; code for causing the computer to validate the attestation result using the key.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
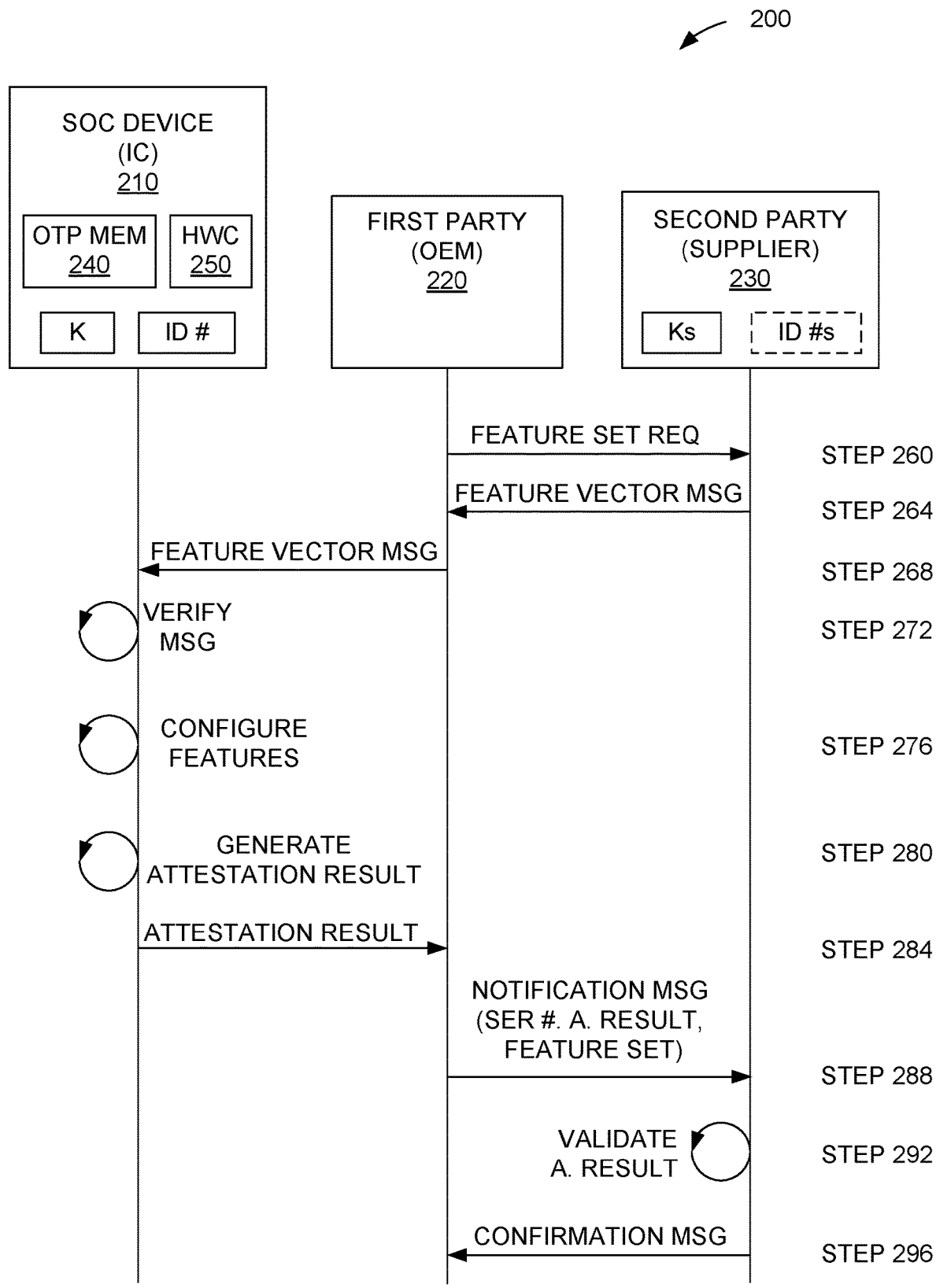
FIG. 2 is a flow diagram of a method for configuring an integrated circuit with a requested feature set, according to the present invention.
Figure 3:
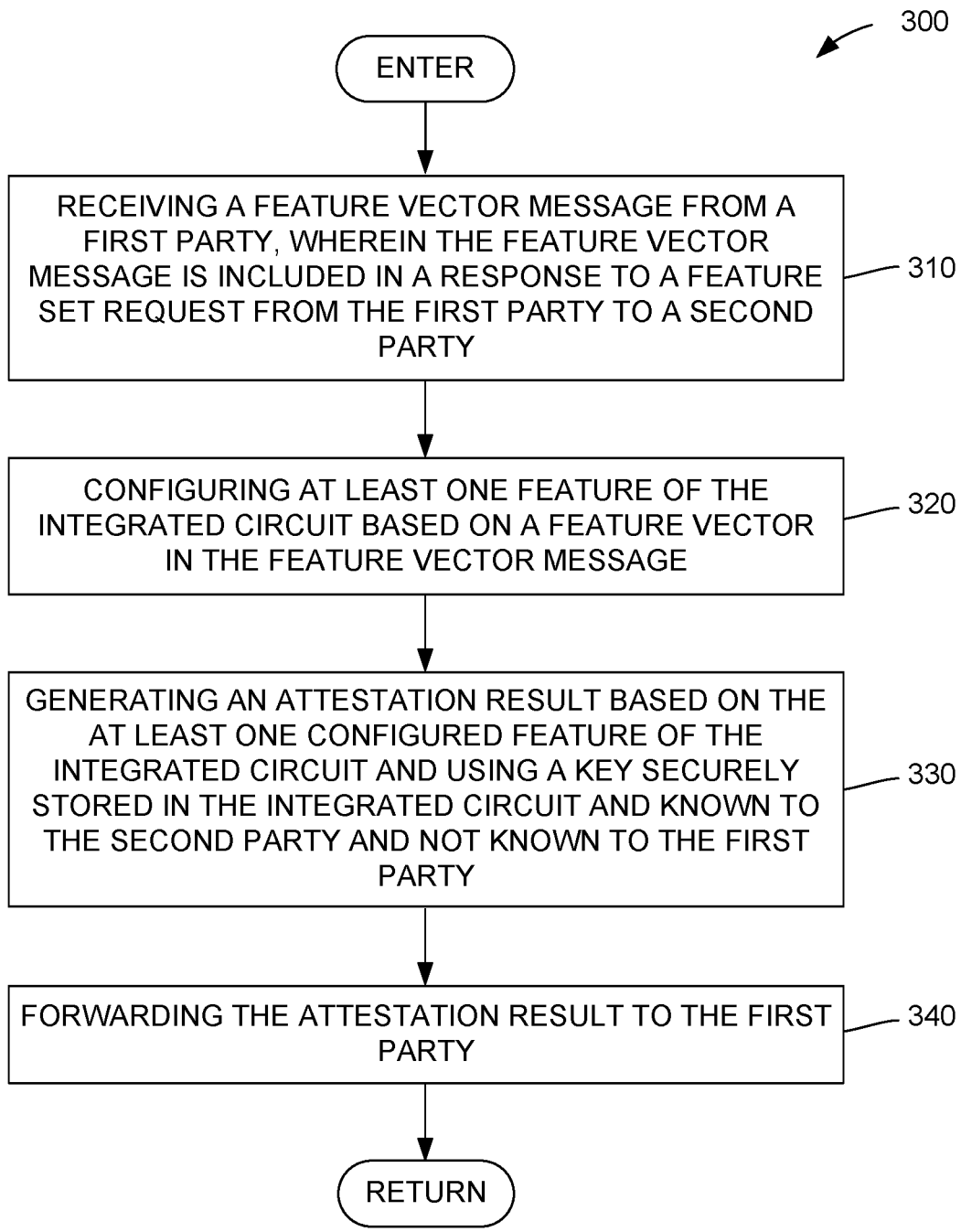
FIG. 3 is a flow diagram of a method for configuring an integrated circuit with a feature set, according to the present invention.

With reference to FIGS. 2 and 3, an aspect of the present invention may reside in a method 300 for configuring an integrated circuit (IC) 210. In the method, the integrated circuit receives a feature vector message from a first party 220 (step 310). The feature vector message is included in a response to a feature set request from the first party to a second party 230. The integrated circuit configures at least one feature of the integrated circuit based on a feature vector in the feature vector message (step 320). The integrated circuit generates an attestation result based on the at least one configured feature of the integrated circuit and using a key K securely stored in the integrated circuit and known to the second party and not known to the first party (step 330). The integrated circuit may forward the attestation result to the first party (step 340).

In more detailed aspects of the invention, the integrated circuit 210 may be a system-on-a-chip (SOC) device, the first party 220 may an original equipment manufacturer, and/or the second party 230 may be a supplier of the integrated circuit. The integrated circuit may be identified by a unique identifier (ID #), and the key may be unique to the integrated circuit. Also, the feature set may correspond to a stock keeping unit (SKU).

In other more detailed aspects of the invention, the feature vector message may be signed by the second party 230, and the method may further comprise: validating, by the integrated circuit 210, the feature vector message using a signature of the feature vector message. In addition, the method may further comprise: setting, by the integrated circuit, at least one flag in a one-time-programmable (OTP) memory 240, wherein each set flag is associated with a feature of the integrated circuit. A set flag in the OTP memory may correspond to a disabled feature, or an enabled feature.

The integrated circuit (IC) 210 may include a secure hardware block or core (HWC) 250. A suitable HWC may be supplied by Cryptographic Research, Incorporated (CRI) of San Francisco, Calif. The HWC holds or has exclusive access to the secret key K. The key may be a symmetric key (e.g. AES key) or a private key (e.g. RSA or ECC private key). The key may be unique per integrated circuit, or it may be shared across integrated circuits. A per-device key stored in the OTP 240 offers excellent security, but backend verification by the supplier/vendor 230 involves added operational complexity requiring management lookup of a large database of per-device keys. Conversely, a globally shared key is less secure, since exposure of the key collapses the security of the system. However, a globally shared key makes for much simpler backend management. The key cannot be extracted from the integrated circuit, and otherwise it is known only to the supplier 230 (e.g., the global key or the per device/IC keys Ks). Specifically, the key must not be accessible to the OEM 220. The HWC has exclusive read and write access to the OTP memory 240 that persistently stores the configuration state of the integrated circuit. The HWC must have access to a unique IC identifier. The identifier does not have to be secret, but its authenticity must be ensured. The HWC is capable of creating a signature or HMAC over the values held by the OTP memory.

With more specific reference to the method shown in FIG. 2, an OEM 220 makes an official request to the IC supplier/vendor (i.e., manufacturer) 230, stating that they wish to manufacture/configure ICs 210 of a certain feature set (SKU) or group of feature sets (SKUs) (step 260). At this point, the OEM does not need to indicate how many IC of a given feature set they intend to produce, and they are free to leave the configuration decision up until the time that the IC is actually configured. The OEM orders a number of ICs from the supplier. All these ICs are the same initial "default" configuration. Typically, these ICs would have all features enabled by default, and the OEM would pay a premium price for each IC. However, depending on the business relationships between the supplier and the OEM(s), variations on this approach are possible. For example, the "default" configuration may have most or all premium features disabled by default, in which case the OEM only initially pays for the "base" configuration.

Figure 4:
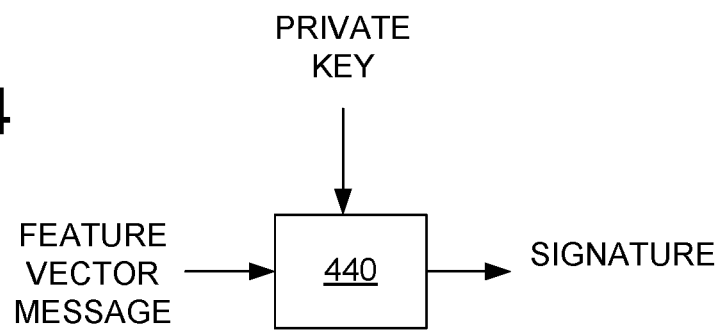
FIG. 4 is a flow diagram of a method generating a signature for a feature vector message.

The IC supplier 230 creates a feature vector message that will be interpreted by the HWC 250 of the IC 210. The message contains the specific feature vector corresponding to the feature set requested by the OEM. With reference to FIG. 4, the message may be digitally signed (but does not have to be). The signature may be generated over the message using a keyed function 440 such as the RSA algorithm. The private key may have a corresponding public key and may not be related to the key K used to generate the attestation result. The message signature may be verified by the HWC before it processes it. The message does not need to be encrypted, but its authenticity should be ensured. The supplier forwards the feature vector message to the OEM (step 264).

At some time during the device manufacturing process, the OEM 220 feeds the message into the HWC 250 of the IC 210 (step 268). The same global message may be fed into each IC configured under the specified feature set (SKU). The mechanism for loading the message is left up to the OEM. For example, the message could be stored in a file on the IC, or built into the SW image, or fed into the IC from an external tester.

Figure 5:
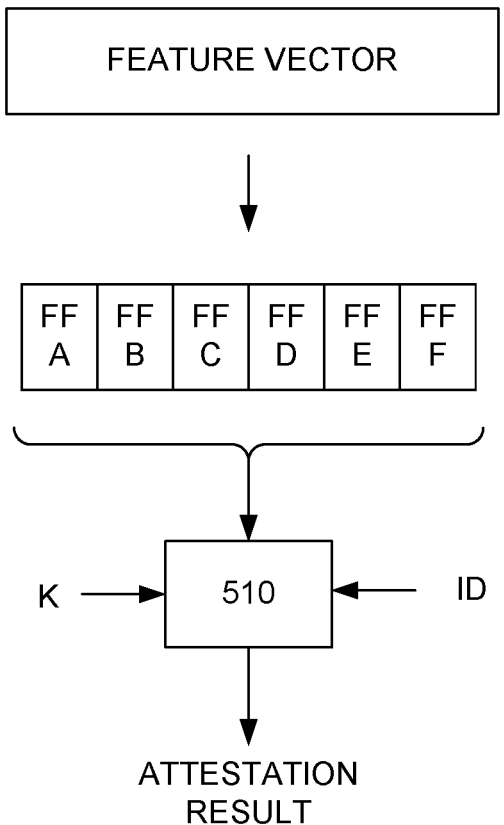
FIG. 5 is a flow diagram of a method for generating an attestation result.

The HWC 250 may verify the feature vector message (it may check a signature) (step 272). It then checks that a predefined nonvolatile "lifecycle bit" is not set. If it is set, the HWC terminates the operation. If it is not set, the HWC retrieves the feature vector from the message payload, and writes this feature vector to OTP memory 240 (e.g., blows the appropriate fuse bits) (step 276). The feature flags (FF) or bits are shown in FIG. 5. The flags may correspond to certain features such as activating or deactivating modem capabilities (e.g., CDMA or UMTS), setting maximum modem data bandwidth (e.g., via carrier aggregation), turning on or off a processor (CPU), setting maximum display resolution, setting maximum camera resolution, or activating or deactivating software features. The HWC then sets the predefined lifecycle bit.

The role of the lifecycle bit is to ensure that any/all feature vector messages can only be consumed once by the HWC 250. This prevents certain attacks by the OEM 220 using multiple feature vector messages with the same IC 210, but only reporting the lowest featured result. The HWC then reads the unique chip ID from OTP, and signs or HMACs over the chip ID and feature vector values (step 280). See also, FIG. 5. The HMAC may use the AES-256 algorithm, and the signature may use the RSA algorithm. The resulting signature/keyed digest (attestation result) is exported by the HWC. The OEM reads and records this HWC attested result (step 284).

For each IC 210, the OEM 220 presents the supplier 230 with the <chip ID, attested result, requested feature set> triplet (step 288). The chip supplier then verifies the expected result against the OEM supplied result for the specified chip ID and feature set (step 292). If the values match, the supplier forwards a confirmation message to the OEM (step 296).

As examples, the supplier 230 may issue the OEM 220 a rebate for all of the unused features. However, if the value does not match the expected result, this may indicate an illicit configuration attempt, and the supplier may take the appropriate action.

The techniques shown in FIG. 2 allow "just-in-time" IC configuration by OEMs 220 during manufacturing. The HWC 250 of the IC/SoC 210 receives a static feature vector message, and returns an attestation result. This capability is supported without the need for deploying and operating secure infrastructure, and without the need for a "live" connection to the supplier. Only the end points, i.e., the HWC 250 and the supplier 230, need to be secure. The communication connection with the OEM 220 does not need to be secure or live. In addition, The techniques minimize complexity and test time overhead for the OEM. Each IC/SoC 210 is configured using a single round trip protocol, and the protocol may be executed by any off-chip or on-chip entity. The protocol may be triggered at any time during the manufacturing process, at a time that fits best with the OEM's existing flows.

Another aspect of the invention may reside in an integrated circuit 210, comprising: means (e.g., HWC 250) for receiving a feature vector message from a first party 220, wherein the feature vector message is included in a response to a feature set request from the first party to a second party 230; means (e.g., HWC 250) for configuring at least one feature of the integrated circuit based on a feature vector in the feature vector message; means (e.g., HWC 250) for generating an attestation result based on the at least one configured feature of the integrated circuit and using a key securely stored in the integrated circuit and known to the second party and not known to the first party; and means (e.g., HWC 250) for forwarding the attestation result to the first party.

Another aspect of the invention may reside in an integrated circuit, comprising: a processor (e.g., HWC 250) configured to: receive a feature vector message from a first party, wherein the feature vector message is included in a response to a feature set request from the first party to a second party; configure at least one feature of the integrated circuit based on a feature vector in the feature vector message; generate an attestation result based on the at least one configured feature of the integrated circuit and using a key securely stored in the integrated circuit and known to the second party and not known to the first party; and forward the attestation result to the first party.

A remote station 102 (FIG. 1) may comprise a computer 600 that includes a processor 610, a storage medium 620 such as memory and/or a disk drive, a display 630, and an input such as a keypad 640, and a wireless connection 650.

Figure 7:
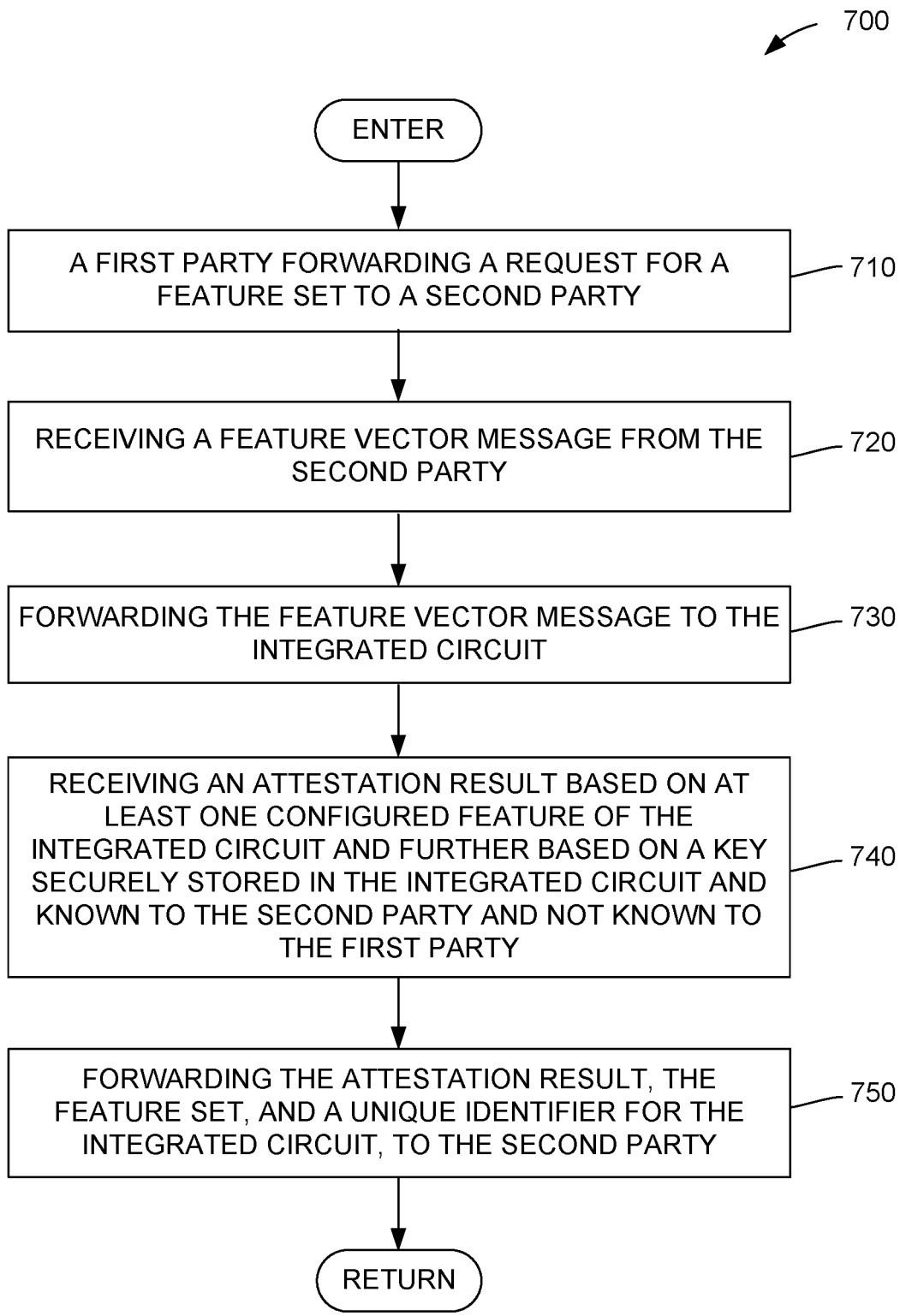
FIG. 7 is flow diagram of another method for configuring an integrated circuit with a feature set, according to the present invention.

With reference to FIGS. 2 and 7, another aspect of the invention may reside in a method 700 for configuring an integrated circuit 210. In the method, a first party 220 forwards a request for a feature set to a second party 230 (step 710). In response, the first party receives a feature vector message from the second party (step 720). The first party forwards the feature vector message to the integrated circuit (step 730). The first party receives an attestation result based on at least one configured feature of the integrated circuit and further based on a key securely stored in the integrated circuit and known to the second party and not known to the first party (step 740). The first party forwards the attestation result, the feature set, and a unique identifier for the integrated circuit, to the second party (step 750).

Another aspect of the invention may reside in a station (e.g., a computer 600) of a first party 220, comprising: means (e.g., processor 610) for forwarding a request for a feature set to another station of a second party 230; means (e.g., processor 610) for receiving a feature vector message from the another station; means (e.g., processor 610) for forwarding the feature vector message to an integrated circuit 210; means (e.g., processor 610) for receiving an attestation result based on at least one configured feature of the integrated circuit and further based on a key securely stored in the integrated circuit and known to the another station and not known to the station; and means (e.g., processor 610) for forwarding the attestation result, the feature set, and a unique identifier for the integrated circuit, to the another station.

Another aspect of the invention may reside in a station (e.g., a computer 600) of a first party 220, comprising: a processor (e.g., processor 610) configured to: forward a request for a feature set to another station of a second party 230; receive a feature vector message from the another station; forward the feature vector message to an integrated circuit 210; receive an attestation result based on at least one configured feature of the integrated circuit and further based on a key securely stored in the integrated circuit and known to the another station and not known to the station; and forward the attestation result, the feature set, and a unique identifier for the integrated circuit, to the another station.

Another aspect of the invention may reside in a computer-readable medium (e.g., storage medium 620), comprising: code for causing a computer (e.g., 600) of a first party 220 to forward a request for a feature set to another computer of a second party 230; code for causing the computer to receive a feature vector message from the another computer; code for causing the computer to forward the feature vector message to an integrated circuit 210; code for causing the computer to receive an attestation result based on at least one configured feature of the integrated circuit and further based on a key securely stored in the integrated circuit and known to the another computer and not known to the computer; and code for causing the computer to forward the attestation result, the feature set, and a unique identifier for the integrated circuit, to the another station.

Figure 8:
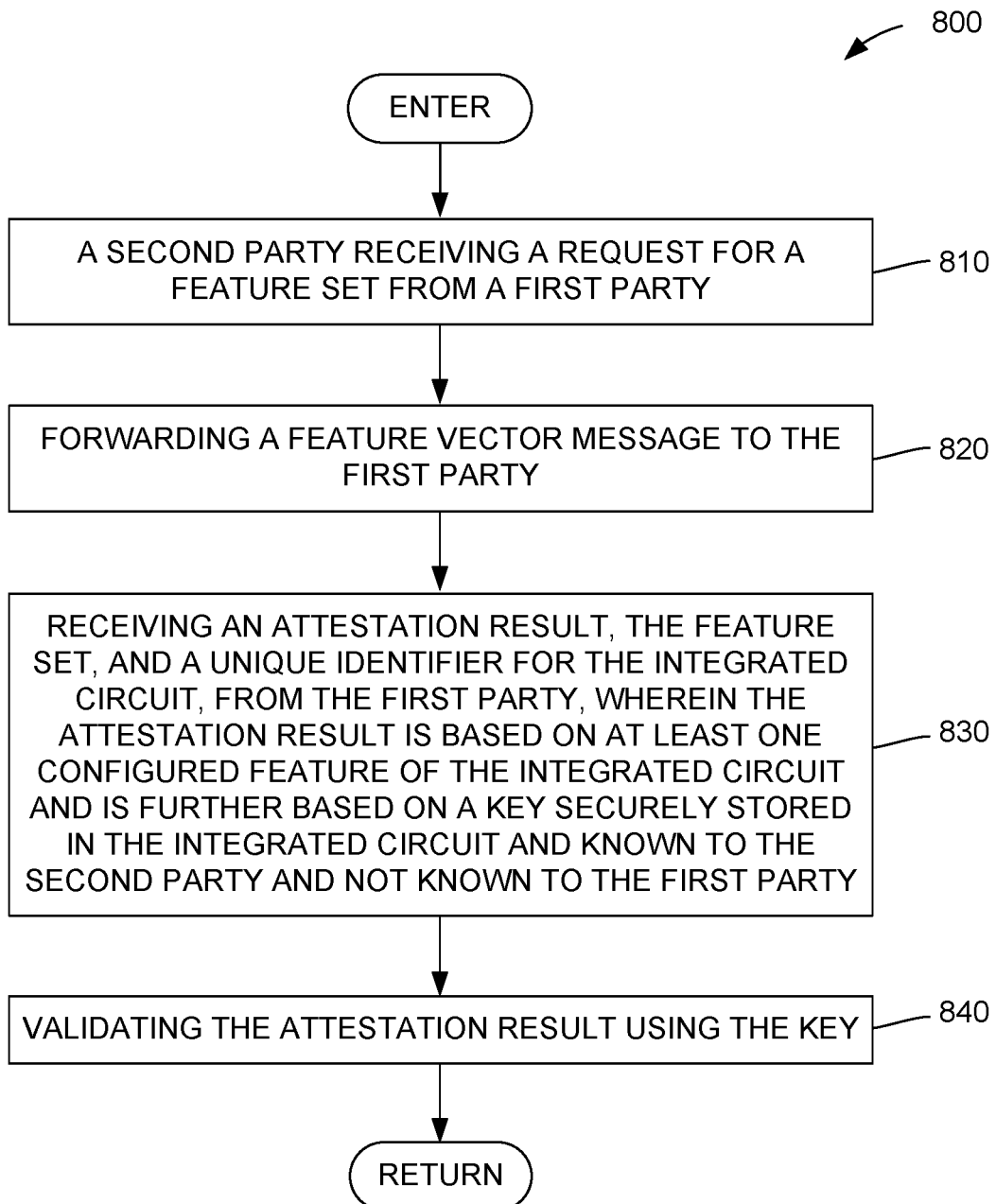
FIG. 8 is a flow diagram of a method for validating features of an integrated circuit, according to the present invention.

With reference to FIGS. 2 and 8, another aspect of the present invention may reside in a method 800 for validating features of an integrated circuit 210. In the method, a second party receives a request for a feature set from a first party (step 810). The second party forwards a feature vector message to the first party (step 820). The second party receives an attestation result, the feature set, and a unique identifier for the integrated circuit, from the first party (step 830). The attestation result is based on at least one configured feature of the integrated circuit and is further based on a key securely stored in the integrated circuit and known to the second party and not known to the first party. The second party validates the attestation result using the key (step 840).

Another aspect of the invention may reside in a station (e.g., another computer such as computer 600) of a second party 230, comprising: means (e.g., processor 610) for receiving a request for a feature set from another station of a first party 220; means (e.g., processor 610) for forwarding a feature vector message to the another station; means (e.g., processor 610) for receiving an attestation result, the feature set, and a unique identifier for an integrated circuit 210, from the another station, wherein the attestation result is based on at least one configured feature of the integrated circuit and is further based on a key securely stored in the integrated circuit and known to the station and not known to the another station; and means (e.g., processor 610) for validating the attestation result using the key.

Another aspect of the invention may reside in a station (e.g., another computer such as computer 600) of a second party 230, comprising: a processor (e.g., processor 610) configured to: receive a request for a feature set from another station of a first party 220; forward a feature vector message to the another station; receive an attestation result, the feature set, and a unique identifier for an integrated circuit 210, from the another station, wherein the attestation result is based on at least one configured feature of the integrated circuit and is further based on a key securely stored in the integrated circuit and known to the station and not known to the another station; and validate the attestation result using the key.

Another aspect of the invention may reside in a computer-readable medium (e.g., storage medium 620), comprising: code for causing a computer (e.g., 600) of a second party 230 to receive a request for a feature set from a another computer of a first party 220; code for causing the computer to forward a feature vector message to the another computer; code for causing the computer to receive an attestation result, the feature set, and a unique identifier for an integrated circuit 210, from the another computer, wherein the attestation result is based on at least one configured feature of the integrated circuit and is further based on a key securely stored in the integrated circuit and known to the computer and not known to the another computer; code for causing the computer to validate the attestation result using the key.

Figure 1:
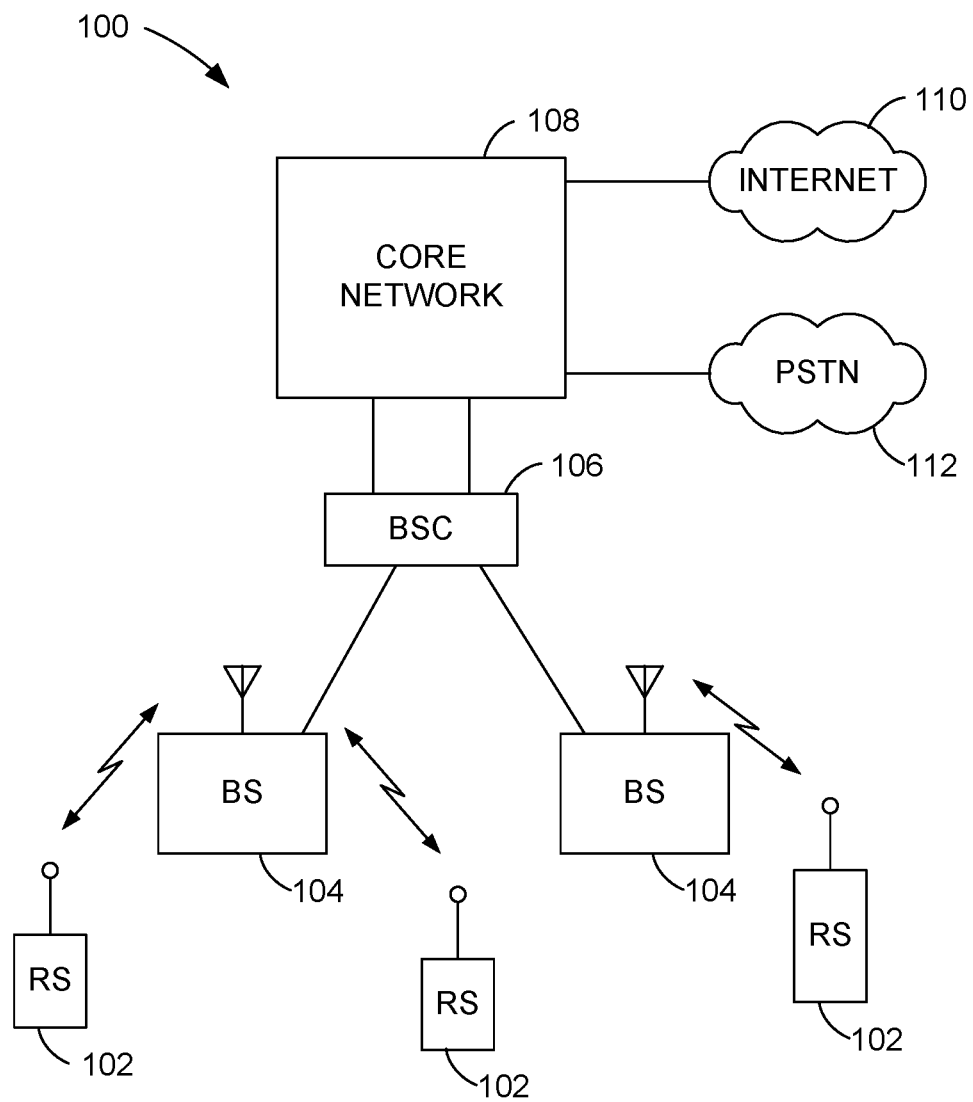
FIG. 1 is a block diagram of an example of a wireless communication system.
Figure 6:
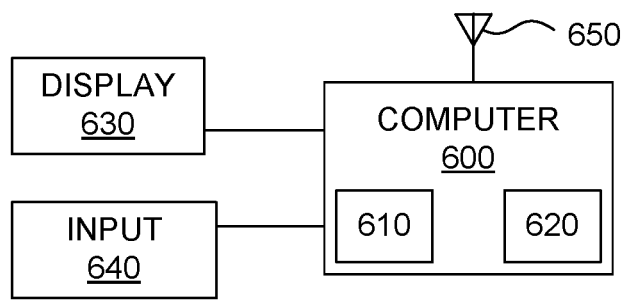
FIG. 6 is a block diagram of a computer including a processor and a memory.

With reference to FIG. 1, a wireless remote station (RS) 102 (e.g. a mobile station MS) may communicate with one or more base stations (BS) 104 of a wireless communication system 100. The mobile station may include a SoC 210. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for configuring an integrated circuit, comprising:

receiving, by the integrated circuit, a feature vector message from a first party, wherein the feature vector message is included in a response to a feature set request from the first party to a second party;

configuring, by the integrated circuit, at least one feature of the integrated circuit based on a feature vector in the feature vector message;

generating, by the integrated circuit and in response to receiving the feature vector message, an attestation result based on the at least one configured feature of the integrated circuit and using a key securely stored in the integrated circuit and known to the second party and not known to the first party; and forwarding the attestation result to the first party.

2. The method of claim 1, wherein the integrated circuit is a system-on-a-chip (SOC) device.

3. The method of claim 1, wherein the first party is an original equipment manufacturer, and the second party is a supplier of the integrated circuit.

4. The method of claim 1, the feature vector message is signed by the second party, and the method further comprises:

validating, by the integrated circuit, the feature vector message using a signature of the feature vector message.

5. The method of claim 1, wherein the integrated circuit is identified by a unique identifier, and the key is unique to the integrated circuit.

6. The method of claim 1, wherein a feature set of the feature set request corresponds to a stock keeping unit (SKU).

7. The method of claim 1, further comprising:

setting, by the integrated circuit, at least one flag in a one-time-programmable (OTP) memory, wherein each set flag is associated with a feature of the integrated circuit.

8. The method of claim 1, wherein the integrated circuit stores a unique chip identifier (chip ID) and the attestation result is based on the chip ID, the at least one configured feature of the integrated circuit, and the key securely stored in the integrated circuit and known to the second party and not known to the first party.

9. The method of claim 1, further comprising, checking if a lifecycle bit is set, and if set, then terminating the configuring, generating, and forwarding; and if not set, performing the configuring, generating, and forwarding, wherein the lifecycle bit prevents more than one feature vector message from being configured by the integrated circuit.

10. An integrated circuit, comprising:

means for receiving a feature vector message from a first party, wherein the feature vector message is included in a response to a feature set request from the first party to a second party;

means for configuring at least one feature of the integrated circuit based on a feature vector in the feature vector message;

means for generating an attestation result, in response to receiving the feature vector message, based on the at least one configured feature of the integrated circuit and using a key securely stored in the integrated circuit and known to the second party and not known to the first party; and means for forwarding the attestation result to the first party.

11. The integrated circuit of claim 10, wherein the integrated circuit is a system-on-a-chip (SOC) device.

12. The integrated circuit of claim 10, wherein the first party is an original equipment manufacturer, and the second party is a supplier of the integrated circuit.

13. The integrated circuit of claim 10, wherein the feature vector message is signed by the second party, and the integrated circuit further comprises:

means for validating the feature vector message using a signature of the feature vector message.

14. The integrated circuit of claim 10, wherein the integrated circuit is identified by a unique identifier, and the key is unique to the integrated circuit.

15. The integrated circuit of claim 10, wherein a feature set of the feature set request corresponds to a stock keeping unit (SKU).

16. The integrated circuit of claim 10, further comprising:

means for setting at least one flag in a one-time-programmable (OTP) memory, wherein each set flag is associated with a feature of the integrated circuit.

17. The integrated circuit of claim 16, wherein a set flag in the OTP memory corresponds to a disabled feature.

18. The integrated circuit of claim 16, wherein a set flag in the OTP memory corresponds to an enabled feature.

19. A station, comprising:

an integrated circuit including a processor configured to:

receive a feature vector message from a first party, wherein the feature vector message is included in a response to a feature set request from the first party to a second party;

configure at least one feature of the integrated circuit based on a feature vector in the feature vector message;

generate an attestation result, in response to receiving the feature vector message, based on the at least one configured feature of the integrated circuit and using a key securely stored in the integrated circuit and known to the second party and not known to the first party; and forward the attestation result to the first party.

20. The station of claim 19, wherein the integrated circuit is a system-on-a-chip (SOC) device.

21. The station of claim 19, wherein the first party is associated with an original equipment manufacturer, and the second party is associated with a supplier of the integrated circuit.

22. The station of claim 19, wherein the feature vector message is signed by the second party.

23. The station of claim 19, wherein the feature set corresponds to a stock keeping unit (SKU).

24. The station of claim 19, wherein the key is a global key shared by more than one integrated circuit.

25. A station, comprising:

a processor configured to:

forward a request for a feature set to another station;

receive a feature vector message from the another station;

forward the feature vector message to an integrated circuit;

receive an attestation result, in response to forwarding the feature vector message, based on at least one configured feature of the integrated circuit and further based on a key securely stored in the integrated circuit and known to the another station and not known to the station; and forward the attestation result, the feature set, and a unique identifier for the integrated circuit, to the another station.

26. The station of claim 25, wherein the integrated circuit is a system-on-a-chip (SOC) device.

27. The station of claim 25, wherein the station is associated with an original equipment manufacturer, and the another station is associated with a supplier of the integrated circuit.

28. The station of claim 25, wherein the feature vector message is signed by the another station.

29. The station of claim 25, wherein the feature set corresponds to a stock keeping unit (SKU).

30. The station of claim 25, wherein the key is a global key shared by more than one integrated circuit.

\* \* \* \* \*